US008375246B2

(12) United States Patent
Ito (10) Patent No.: US 8,375,246 B2
(45) Date of Patent: Feb. 12, 2013

(54) INFORMATION RECORDING APPARATUS AND INFORMATION RECORDING METHOD

(75) Inventor: Seigo Ito, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 291 days.

(21) Appl. No.: 12/823,914

(22) Filed: Jun. 25, 2010

(65) Prior Publication Data

US 2010/0329094 A1  Dec. 30, 2010

(30) Foreign Application Priority Data

Jun. 30, 2009  (JP) ................... 2009-155998

(51) Int. Cl.
*G06F 11/00* (2006.01)
(52) U.S. Cl. .................... 714/6.13; 714/704; 369/30.22
(58) Field of Classification Search .................. None
See application file for complete search history.

(56) References Cited

U.S. PATENT DOCUMENTS

| 2003/0081525 | A1 | 5/2003 | Yoneyama et al. |
| 2007/0115783 | A1 | 5/2007 | Nakayama |

FOREIGN PATENT DOCUMENTS

| JP | 2001-351342 | A | 12/2001 |
| JP | 2002-117618 | | 4/2002 |
| JP | 2002-117618 | A | 4/2002 |
| JP | 2002-324321 | | 11/2002 |
| JP | 2003-132630 | | 5/2003 |
| JP | 2005-025861 | A | 1/2005 |
| JP | 2007-035100 | | 2/2007 |
| JP | 2007-149161 | A | 6/2007 |
| JP | 2008-210420 | A | 9/2008 |
| JP | 2008-282456 | A | 11/2008 |
| JP | 2009-155998 | | 7/2009 |

OTHER PUBLICATIONS

Information Sheet for preparing an Information Disclosure Statement.
Notice of Reasons for Rejection mailed by Japan Patent Office on Sep. 7, 2010 in the corresponding Japanese patent application No. 2009-155998.
Japanese Office Action dated Jan. 10, 2012 for Japanese Application No. 2010-284621.

*Primary Examiner* — Scott Baderman
*Assistant Examiner* — Jason Bryan
(74) *Attorney, Agent, or Firm* — Knobbe, Martens, Olson & Bear LLP (57) ABSTRACT

According to one embodiment, an information recording apparatus for recording, in a free area, first low-quality recorded data having an error rate not less than a first error rate upon finalization of a recording medium, the information recording apparatus includes a reader, a measurement module, a detector, and a recorder. The reader is configured to read recorded data from a recording area of the recording medium. The measurement module is configured to measure an error rate of the recorded data of each predetermined data block. The detector configured to detect the first low-quality recorded data based on an error rate measurement result of the measurement module. The recorder is configured to correct an error in the first low-quality recorded data, and record error-corrected recorded data corresponding to the first low-quality recorded data at a spare recording position of the free area of the recording medium.

3 Claims, 12 Drawing Sheets

Designate lower limit error rate of part to be double-recorded

○ $1.0 \times 10^{\wedge} -2$

◎ $2.0 \times 10^{\wedge} -3$

○ $1.0 \times 10^{\wedge} -3$

○ Designate : $3.0 \times 10^{\sim} -3$

○ Auto

[Execute]
[Cancel]

FIG. 4

Designate part to be double-recorded

○ Unreadable

◎ May be unreadable soon

○ May be unreadable in future

○ Auto

[Execute]
[Cancel]

Double registration information

| Number of tables N | Error rate ER |
|---|---|
| Replacement source address S1 | Replacement destination address D1 |
| Replacement source address S2 | Replacement destination address D2 |
| Replacement source address S3 | Replacement destination address D3 |
| ⋮ | ⋮ |
| Replacement source address SN | Replacement destination address DN |

FIG. 10

Double registration information

| Number of tables N | Error rate ER |
|---|---|
| Replacement source address S1 | Replacement destination address D1 |
| Replacement source address S2 | Replacement destination address D2 |
| Replacement source address S3 | Replacement destination address D3 |
|  | ⋮ |
| Replacement source address SN | Replacement destination address DN |

Registered in case of read NG    Not registered in case of read OK

Playback disabled location replacement management information

| | |
|---|---|
| Replacement source address S2 | Replacement destination address D2 |
| | |
| | ⋮ |
| | |

Low-quality management information

| Number of tables N | |
|---|---|
| Low-quality address S1 | Error rate ER1 |
| Low-quality address S2 | Error rate ER2 |
| Low-quality address S3 | Error rate ER3 |
| ⋮ | |
| Low-quality address SN | Error rate ERN |

INFORMATION RECORDING APPARATUS AND INFORMATION RECORDING METHOD

CROSS-REFERENCE TO RELATED APPLICATIONS

This application is based upon and claims the benefit of priority from Japanese Patent Application No. 2009-155998, filed Jun. 30, 2009; the entire contents of which are incorporated herein by reference.

FIELD

Embodiments described herein relate generally to an information recording apparatus and information recording method of fixing recorded data by finalization.

BACKGROUND

Jpn. Pat. Appln. KOKAI Publication No. 2002-117618 (reference 1) discloses a data recording apparatus which confirms whether an information signal once recorded by dubbing has correctly been recorded, and if the information signal contains an error, corrects the error to reliably correctly record the information signal.

For example, the data recording apparatus reads data from a CD and writes the read CD data to a HD. Then, the apparatus reads the written data from the HD, compares the read data with the CD data to determine the presence/absence of an error, and replaces the error data with the CD data. This data recording apparatus improves the recording reliability of dubbing.

The makers are attempting to attain higher reliability of digital data not only in the above-described dubbing mode. For example, recording media such as a CD, DVD, HD-DVD, and BD are known to degrade by aging. This sometimes makes it impossible to correctly read data recorded on a recording medium.

The technique disclosed in reference 1 contributes to improve the recording reliability of dubbing but is less effective against the above-described aging.

DETAILED DESCRIPTION

In general, according to one embodiment, an information recording apparatus for recording, in a free area, first low-quality recorded data having an error rate not less than a first error rate upon finalization of a recording medium, the information recording apparatus includes a reader, a measurement module, a detector, and a recorder. The reader is configured to read recorded data from a recording area of the recording medium. The measurement module is configured to measure an error rate of the recorded data of each predetermined data block. The detector configured to detect the first low-quality recorded data based on an error rate measurement result of the measurement module. The recorder is configured to correct an error in the first low-quality recorded data, record error-corrected recorded data corresponding to the first low-quality recorded data at a spare recording position of the free area of the recording medium, and record, at a management data recording position of the free area, recording management information which manages an address of a recording position of the first low-quality recorded data and an address of the spare recording position of the error-corrected recorded data in association with each other.

An embodiment will now be described with reference to the accompanying drawing.

Figure 1:
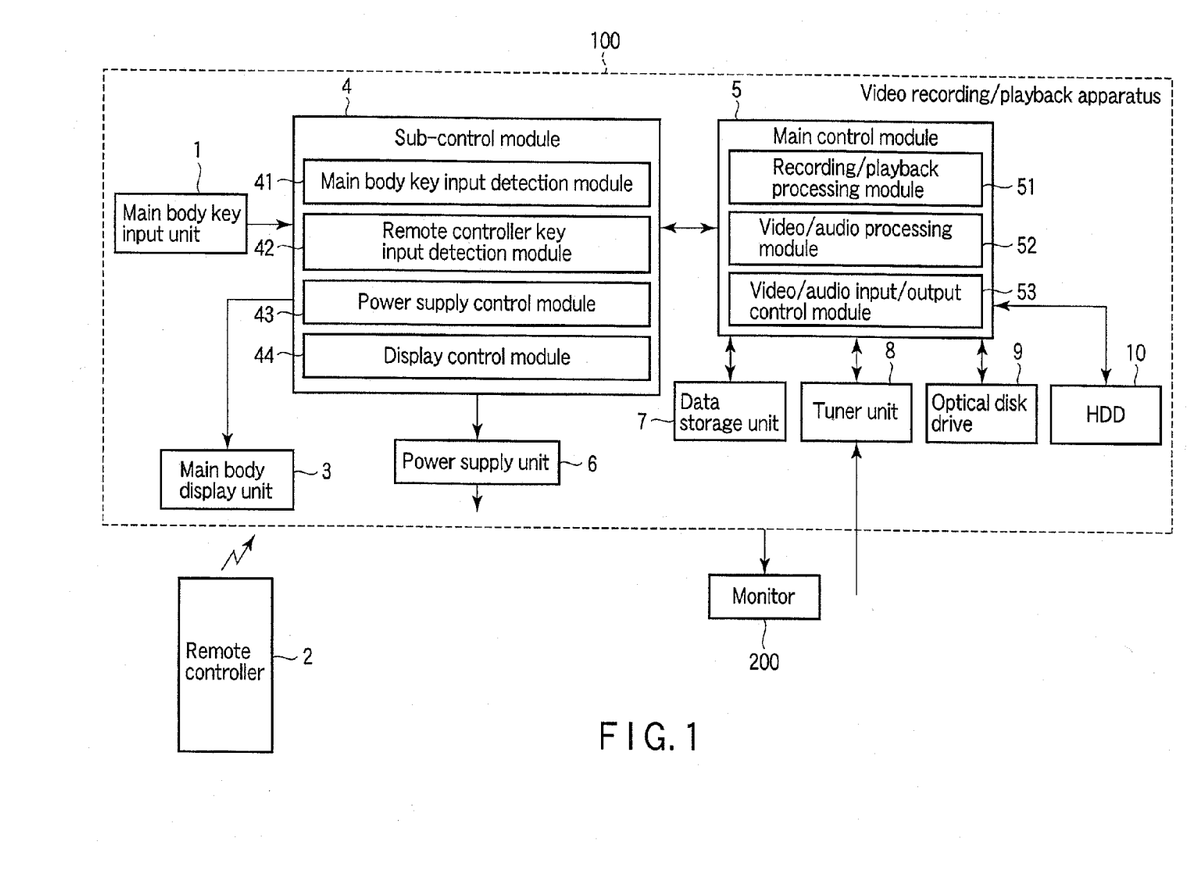
FIG. 1 is an exemplary block diagram showing the schematic arrangement of a video recording/playback apparatus according to an embodiment.

FIG. 1 is a block diagram showing the schematic arrangement of a video recording/playback apparatus according to an embodiment.

As shown in FIG. 1, a video recording/playback apparatus 100 comprises a main body key input unit 1, main body display unit 3, sub-control module (sub-controller) 4, main control module (main controller) 5, power supply unit 6, data storage unit 7, tuner unit 8, optical disk drive 9, and HDD (Hard Disk Drive) 10.

The sub-control module 4 comprises a main body key input detection module (main body key input detector) 41, remote controller key input detection module (remote controller key input detector) 42, power supply control module (power supply controller) 43, and display control module (display controller) 44. The main control module 5 comprises a recording/playback processing module (recording/playback processor) 51, video/audio processing module (video/audio processor) 52, and video/audio input/output control module (video/audio input/output controller) 53. The main control module 5 transmits, to the display control module 44, display data to be displayed on the main body display unit 3. The display control module 44 controls the main body display unit 3 based on the display data. The main body display unit 3 can thus display characters (character strings) or the like corresponding to the display data.

For example, the main body key input unit 1 includes a power key, reserve key, setting keys, eject key, and the like. The user can control the operation of the video recording/playback apparatus 100 by an input operation on the main body key input unit 1.

The power key is used to instruct power on/off of the video recording/playback apparatus 100. When the power key is pressed, the main body key input detection module 41 of the sub-control module 4 detects the press of the power key. The power supply control module 43 of the sub-control module 4 notifies the power supply unit 6 of switching of power on/off. The power supply unit 6 powers on the apparatus if it is off, and powers off the apparatus if it is on.

The reserve key is used to instruct execution of a recording reservation mode in the power on state of the video recording/playback apparatus 100. In the power off state of the video recording/playback apparatus 100, the reserve key instructs power on and execution of the recording reservation mode. When the recording reservation mode is being executed, the reserve key instructs to end the recording reservation mode and power off the apparatus.

The setting keys include up and down keys, left and right keys, enter key, and the like and are used to, e.g., set recording reservation information and do various settings of double recording processing to be described later. When a setting key (up and down keys, left and right keys, or enter key) is pressed, the main body key input detection module 41 of the sub-control module 4 detects the press of the setting key. The sub-control module 4 notifies the main control module 5 of an instruction corresponding to the pressed setting key.

The eject key is used to instruct open/close of the optical disk tray of the optical disk drive 9. The optical disk tray is opened or closed in accordance with press of the eject key. Details of signal processing corresponding to press of the eject key are the same as described above, and a detailed description thereof will not be repeated here.

The optical disk drive 9 can record data on a recording medium such as a CD, DVD, HD-DVD, or BD or read data recorded on the recording medium.

The user can also control the operation of the video recording/playback apparatus 100 by an input operation on a remote controller 2 in addition to the main body key input unit 1.

The video/audio processing module 52 controls, for example, fast-rewind of a program under playback based on a fast-rewind instruction, controls playback of a selected program based on a playback instruction, controls fast-forward of a program under playback based on a fast-forward instruction, controls stop of playback of a program based on a stop instruction, and controls pause of playback of a program based on a pause instruction. The recording/playback processing module 51 controls recording of a program on a selected channel based on a recording instruction and controls playback of a recorded program. The recording destination is, e.g., a DVD in the optical disk drive 9 or an HD in the HDD 10. The recording/playback processing module 51 also controls double recording processing (to be described later), dubbing, and playback processing of a recording medium to which the double recording processing is applied. The video/audio input/output control module 53 controls input/output of video and audio signals input from the tuner unit 8, optical disk drive 9, or HDD drive.

Double recording processing of the video recording/playback apparatus 100 will be explained next. Recording media such as a CD, DVD, HD-DVD, and BD are known to degrade by aging. Data recorded on such a recording medium includes, e.g., an error correction code. Hence, a few errors contained in data read from the recording medium can be corrected using the error correction code. However, when the error rate of the data recorded on the recording medium has risen due to aging so that the number of errors has increased beyond the allowable range of the error correction capability of the error correction code, the data recorded on the recording medium cannot correctly be read. For example, although the data is correctly readable from the recording medium immediately after dubbing, the total error rate rises due to aging, and therefore, it may be impossible to correctly read the data from the recording medium several years later. Data that would be not correctly readable because of aging often have low recording quality already upon data recording. Note that the data that would be not correctly readable is data containing errors which cannot completely be corrected. To the contrary, in correctly readable data, errors contained in it can completely be corrected.

At the time of data recording (finalization) of a recording medium, the video recording/playback apparatus 100 detects low-quality recorded data from data recorded in the recording area of the recording medium and records the low-quality recorded data in the free area of the recording medium. The low-quality recorded data is data having a high error rate. That is, the video recording/playback apparatus 100 records, in the free area, error-corrected recorded data corresponding to the low-quality recorded data while keeping the low-quality recorded data recorded in the original recording area. In this case, even if the low-quality recorded data cannot be read from the original recording area in the future, it is possible to compensate it with the error-corrected recorded data recorded in the free area. Without the data compensation mechanism, the low-quality recorded data may be output as playback data containing block noise. The above-described data compensation mechanism allows to reduce the block noise.

Note that although double recording will be described as an example of data compensation in this embodiment, data may be compensated by multiple recording of any other type such as triple recording or quadruple recording.

Figure 2:
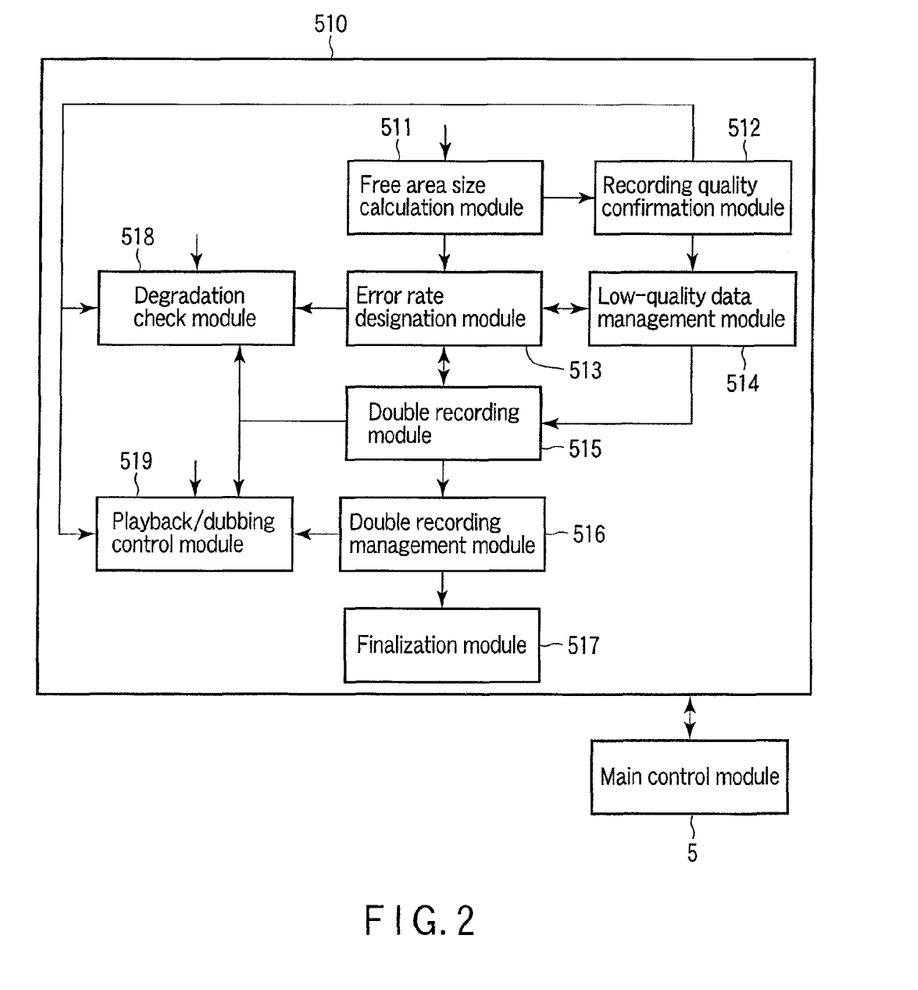
FIG. 2 is an exemplary block diagram showing the schematic arrangement of a double recording processing control module.

FIG. 2 is a block diagram showing the schematic arrangement of the double recording processing control module. For example, a double recording processing control module (double recording processing controller) 510 shown in FIG. 2 is included in the recording/playback processing module 51.

A free area size calculation module (free area size calculator) 511 calculates the size of a free area corresponding to the remaining capacity of a recording medium. A recording quality confirmation module 512 detects the recording quality of all data recorded on a recording medium or data within a designated range. An error rate designation module 513 designates an error rate selected or set via the main body key input unit 1 or the remote controller 2. First low-quality recorded data whose error rate is greater than or equal to the designated error rate (referred to as a first error rate hereinafter) is subjected to double recording.

A low-quality data management module (low-quality data manager) 514 stores a second error rate less than or equal to the above-described first error rate and manages information about second low-quality recorded data whose error rate is greater than or equal to the second error rate. For example, the low-quality data management module 514 manages low-quality management information which associates an address representing the recording position of second low-quality recorded data having an error rate greater than or equal to the second error rate with the error rate of the second low-quality recorded data. Alternatively, the low-quality data management module 514 manages low-quality management information which associates a start address and length representing the recording position of second low-quality recorded data having an error rate greater than or equal to the second error rate with the error rate of the second low-quality recorded data. The latter low-quality management information is used when, for example, the size of second low-quality recorded data needs to be detected.

A double recording module (double recorder) 515 records, in the free area, error-corrected recorded data corresponding to first low-quality recorded data. A double recording management module (double recording manager) 516 records double registration information (recording management information) in the free area. The double registration information is data which associates the address of the recording position of first low-quality recorded data with the address of error-corrected recorded data recorded in the free area. A finalization module 517 executes finalization of a recording medium.

A playback/dubbing control module (playback/dubbing controller) 519 checks, for example, before playback, whether recorded data can be read from its original recording area registered in the double registration information. If the recorded data cannot correctly be read from the original recording area, the playback/dubbing control module 519 replaces the address of the original recording area with the address of a corresponding free area. The playback/dubbing control module 519 reads the recorded data from its original recording area if it has not undergone address replacement, or reads the recorded data from the free area if address replacement has been performed, thereby playing back the read recorded data.

Additionally, when executing, e.g., finalization or dubbing, the playback/dubbing control module 519 controls recording of error-corrected recorded data corresponding to first low-quality recorded data in the free area and recording of double registration information in the free area.

A degradation check module (degradation checker) 518 checks, when executing a degradation check mode, whether first low-quality recorded data can correctly be read from its original recording area registered in the double registration information. If the first low-quality recorded data is correctly readable, the degradation check module 518 determines the degradation state based on the read result of the read first low-quality recorded data. More specifically, the degradation check module 518 checks the error rate of the read first low-quality recorded data. If the error rate of the first low-quality recorded data is higher than a predetermined error rate which requires backup, i.e., it the quality of the first low-quality recorded data has become poorer, a backup request is output. Accordingly, a monitor 200 displays a warning window to prompt the user to create a backup.

First double recording processing will be described next with reference to FIG. 3. In this embodiment, a case will be explained in which the double recording processing is executed in finalization.

Without designation of double recording (NO in BLOCK 11), i.e., if the video recording/playback apparatus 100 has been set not to execute double recording, normal finalization processing is executed (BLOCK 18). In this case, double recording processing is not executed. If double recording has been designated (YES in BLOCK 11), i.e., if the video recording/playback apparatus 100 has been set to execute double recording, double recording processing is executed in finalization.

As described above, if double recording has been designated (YES in BLOCK 11), the free area size calculation module 511 calculates the size of a free area corresponding to the remaining capacity of a recording medium. For a write-once medium, the size of an unrecorded area from the current recording position up to the end of the disk is calculated as the free area size. For an overwritable medium, the free area size is calculated based on a bitmap table which manages the free area.

If no free area exists at all, or the free area size is smaller than a predetermined size (NO in BLOCK 12), the free area size calculation module 511 notifies the user of the shortage of the free area. Accordingly, the monitor 200 displays a notification representing that double recording processing is unexecutable due to the shortage of the free area. In this case, not double recording processing but normal finalization processing is executed (BLOCK 18).

If it is possible to allocate a free area for double recording processing (YES in BLOCK 12), the recording quality confirmation module 512 detects the recording quality of all data recorded on the recording medium or data within a designated range. The low-quality data management module 514 acquires information about low-quality recorded data (BLOCK 13).

Figure 13:
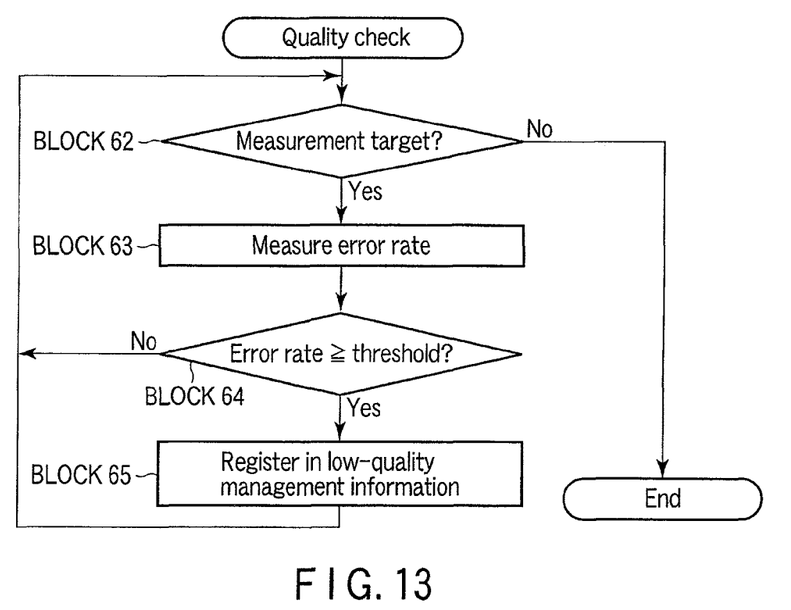
FIG. 13 is a flowchart illustrating an example of recording quality check.
Figure 14:
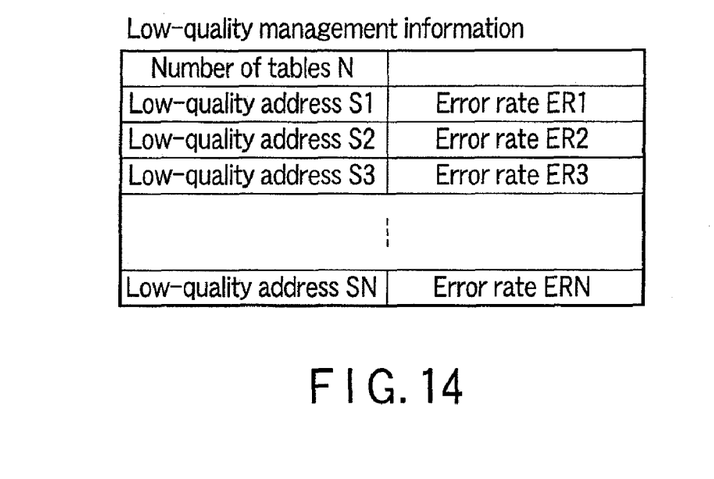
FIG. 14 is a view showing an example of low-quality management information.

FIG. 13 is a flowchart illustrating an example of recording quality check in BLOCK 13 described above. As shown in FIG. 13, the recording quality confirmation module 512 measures the error rate of recorded data of each predetermined recording block (YES in BLOCK 62) (BLOCK 63). For example, the recording quality confirmation module 512 measures the error rate in a recording block such as an error correction code (ECC) block. The low-quality data management module 514 stores a threshold (referred to as a second error rate hereinafter) and registers, in low-quality management information (FIG. 14), information about second low-quality recorded data whose error rate is greater than or equal to the second error rate (YES in BLOCK 64) (BLOCK 65). The low-quality management information associates an address representing the recording position of second low-quality recorded data having an error rate greater than or equal to the second error rate with the error rate of the second low-quality recorded data.

Note that the number of registered low-quality management information can largely change in accordance with the value of the above-described second error rate. For this reason, if the value of the second error rate is set small, the size of a work memory to manage the low-quality management information needs to be set large.

The second low-quality recorded data is extracted using the above-described second error rate for the purpose of speeding up the succeeding first low-quality recorded data extraction processing. First low-quality recorded data has an error rate greater than or equal to the first error rate. Second low-quality recorded data has an error rate greater than or equal to the second error rate. The second error rate is less than or equal to the first error rate. For example, when a plurality of second low-quality recorded data are extracted, recorded data corresponding to first low-quality recorded data can be detected from the plurality of second low-quality recorded data by referring to their error rates.

Figure 17:
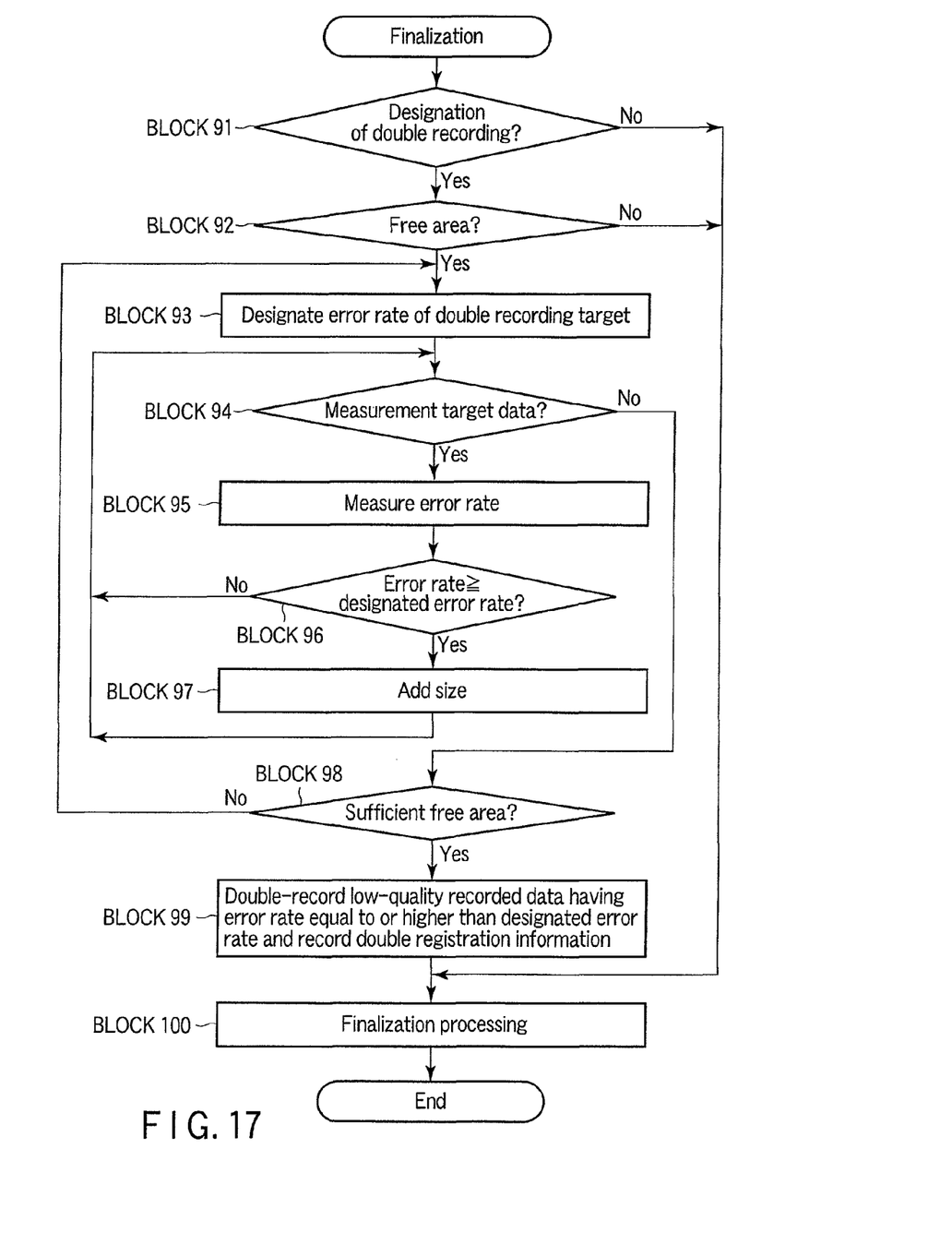
FIG. 17 is a flowchart illustrating an example of second double recording processing.

However, if it is impossible to allocate a work memory of a sufficient size, the double recording processing can be executed without using the low-quality management information. FIG. 17 illustrates double recording processing without using the low-quality management information.

Figure 3:
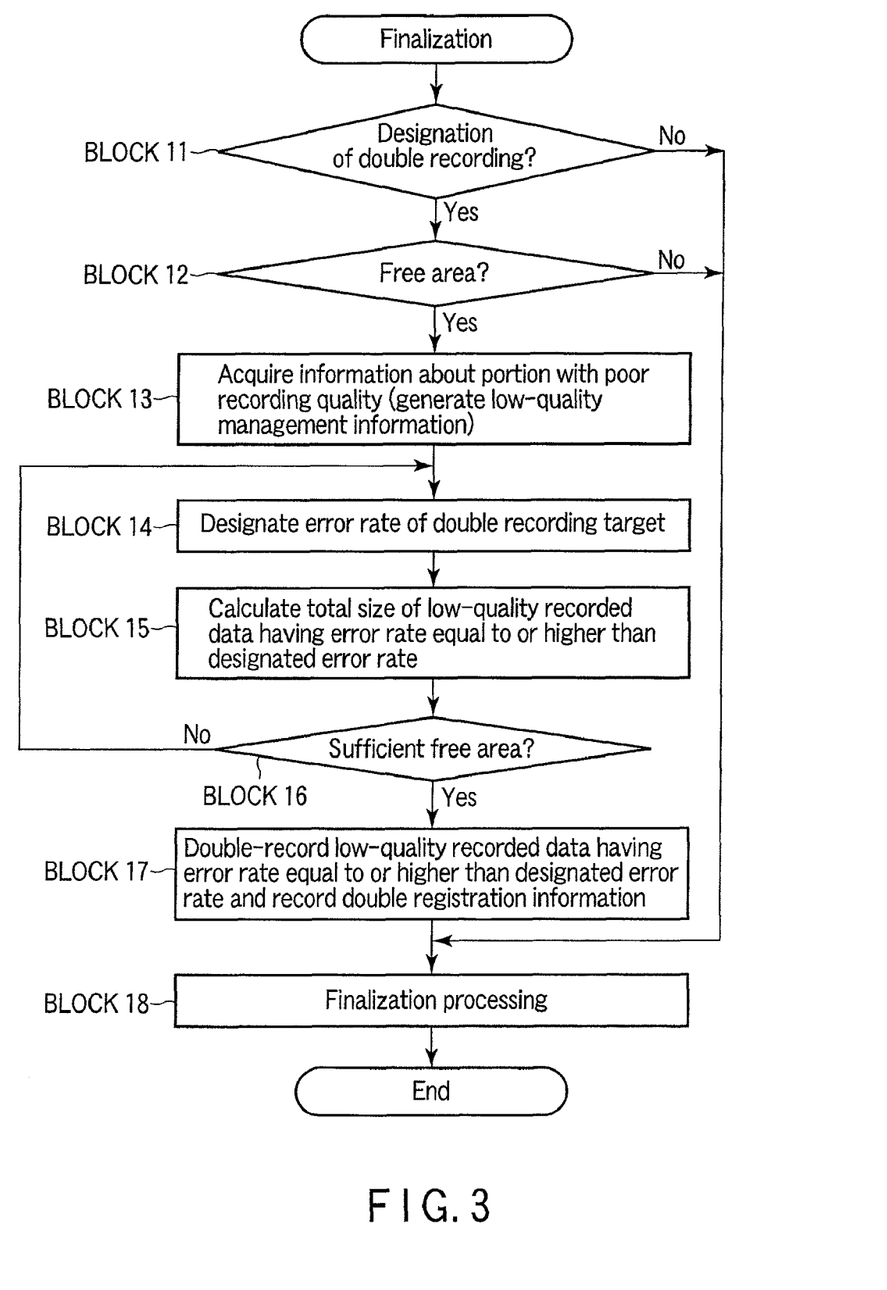
FIG. 3 is a flowchart illustrating an example of first double recording processing.

The explanation of the first double recording processing will be continued by referring back to the flowchart in FIG. 3.

When the low-quality management information is acquired (BLOCK 13), as described above, the process advances to error rate designation processing (BLOCK 14). The above-described second low-quality recorded data having an error rate greater than or equal to the second error rate can directly be subjected to the double recording processing. However, a case will be described in which to further narrow down the targets, first low-quality recorded data having an error rate greater than or equal to the first error rate undergoes the double recording processing.

Figure 4:
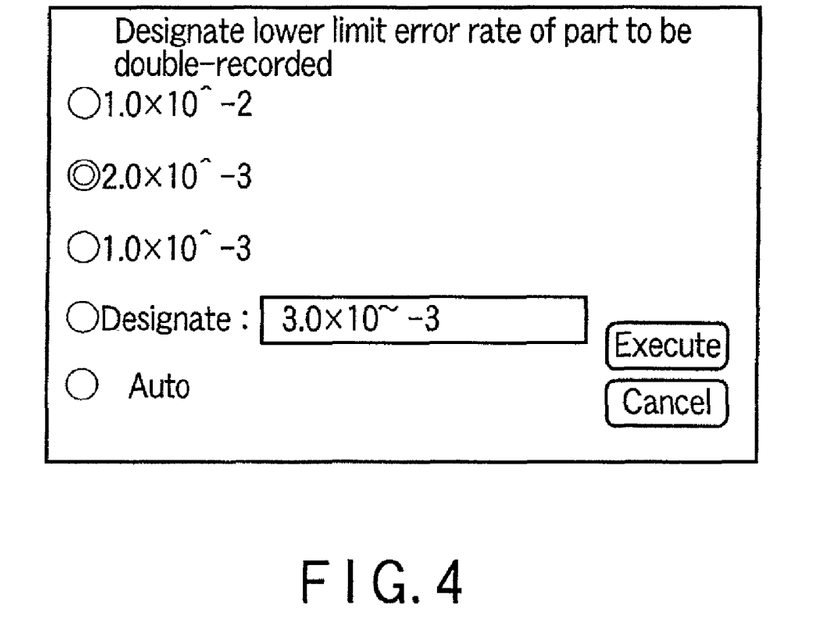
FIG. 4 is a view showing an example of an error rate designation window for a power user.
Figure 5:
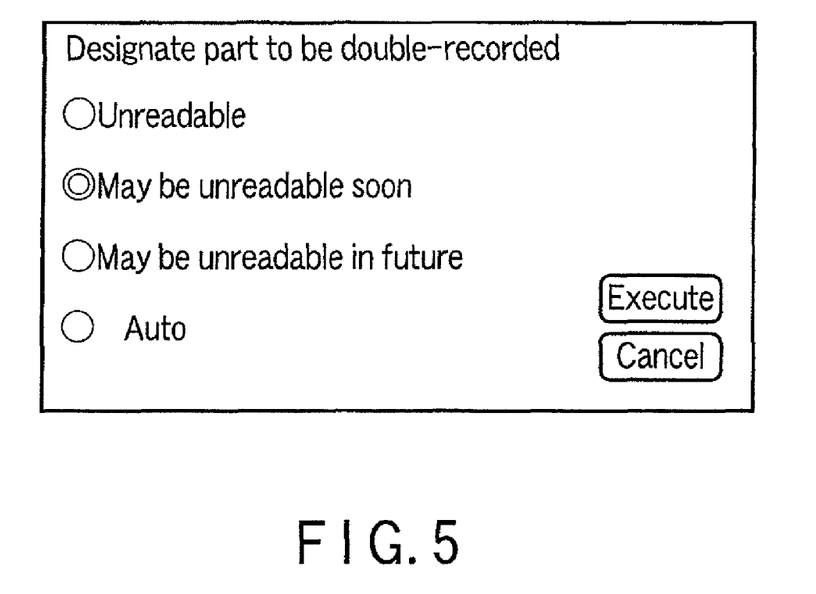
FIG. 5 is a view showing an example of an error rate designation window for a general user.

For example, the error rate designation module 513 instructs to display an error rate designation window. Accordingly, the monitor 200 displays an error rate designation window for a power user as shown in FIG. 4. Alternatively, the monitor 200 displays an error rate designation window for a general user as shown in FIG. 5. Via the error rate designation window for a power user, the user can designate the lower limit error rate (first error rate) of the double recording target or designate automatic setting of the lower limit error rate (first error rate) of the double recording target. Via the error rate designation window for a general user, the user can designate the double recording condition or designate automatic setting of the lower limit error rate (first error rate) of the double recording target.

Note that the error rate designation module 513 can detect a designatable lower limit error rate or double recording condition from the start address, length, and error rate of second low-quality recorded data registered in the low-quality management information and the already detected free area size. Hence, the error rate designation window for a power user permits selection of designatable lower limit error rates but prohibits selection of undesignatable lower limit error rates. Similarly, the error rate designation window for a general user permits selection of designatable double recording conditions but prohibits selection of undesignatable double recording conditions.

When the user has designated automatic setting via the error rate designation window for a power user or the error rate designation window for a general user, an optimum lower limit error rate is automatically set from the start address, length, and error rate of second low-quality recorded data registered in the low-quality management information and the already detected free area size. For example, a lower limit error rate that allows to use the free area to the maximum is automatically set. In other words, the first error rate is automatically set so as to make the size of the first low-quality recorded data having an error rate less than or equal to the first error rate smaller than the free area size.

When error rate designation has ended (BLOCK 14), the double recording management module 516 detects the total size of the designated low-quality recorded data having an error rate greater than or equal to the first error rate by referring to the low-quality management information (BLOCK 15). The double recording management module 516 compares the total size of the free area with that of the designated low-quality recorded data.

If the total size of the first low-quality recorded data is larger than that of the free area, the double recording management module 516 notifies the user that double recording is impossible (NO in BLOCK 16). Accordingly, the error rate designation module 513 instructs to display the error rate designation window again so that the monitor 200 displays the error rate designation window for a power user or the error rate designation window for a general user. The user designates a higher error rate or automatic setting via the window (error rate change request window).

If the total size of the first low-quality recorded data is less than or equal to that of the free area, the double recording management module 516 permits double recording (YES in BLOCK 16). The double recording module 515 corrects errors contained in the first low-quality recorded data using the error correction code and records, in the free area, error-corrected recorded data (i.e., high-quality recorded data) corresponding to the first low-quality recorded data (BLOCK 17).

Figure 10:
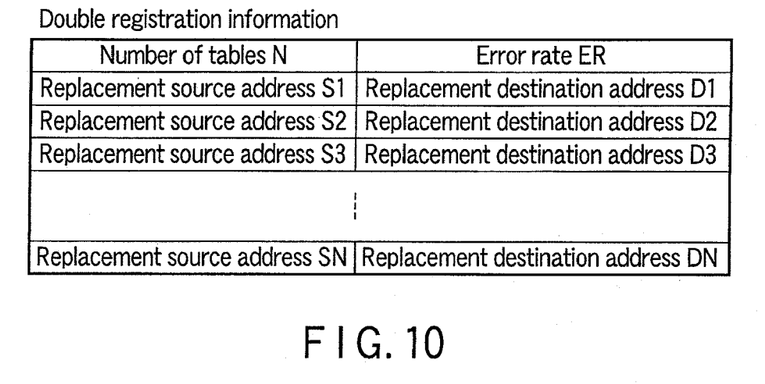
FIG. 10 is a view showing an example of double registration information.

The double recording management module 516 also generates double registration information (FIG. 10) and records it in the free area. The double registration information (recording management information) includes association information between the address (replacement source address) of the recording position of the first low-quality recorded data and the address (replacement destination address) of the recording position of the error-corrected recorded data corresponding to the first low-quality recorded data.

Note that as described above, the error-corrected recorded data (also referred to as double-recorded data hereinafter) and the double registration information may separately be recorded in the free area, or one file including the double-recorded data and the double registration information may be recorded. When recording one file, for example, the double registration information may be recorded as the header information of the one file, whereas the double-recorded data may be recorded as the main body information of the one file.

Figure 12:
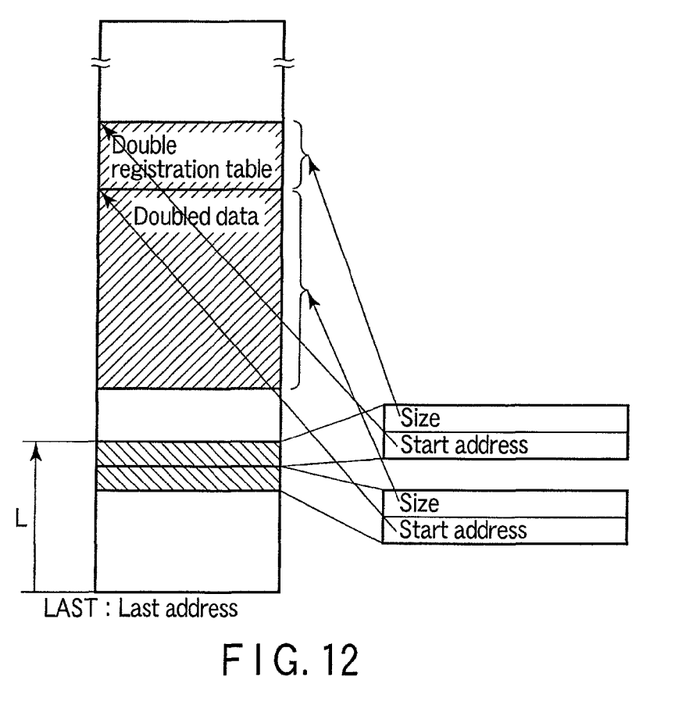
FIG. 12 is a view showing an example of management of double-recorded data and double registration information.

A file system for managing standard files recorded on a recording medium can manage the file of double recording. Alternatively, the file of double recording may be managed by another method, as shown in FIG. 12. Two extent management tables manage the area of double registration information and that of double-recorded data. The extent management tables are allocated in an area having a predetermined length (L) from the LAST address. Referring to the extent management tables enables to access the double registration information and the double-recorded data. This makes it possible to access the double registration information and the double-recorded data from the extent management tables even in a situation in which access from the file system to the double registration information and the double-recorded data fails due to a read error or the like.

When the double-recorded data and the double registration information have been recorded in the above-described way (BLOCK 17), the finalization module 517 executes normal finalization (BLOCK 18). In general, finalization is executed in recording processing of a DVD-RW and DVD-R. Finalization is unnecessary for a random access medium such as a DVD-RAM. However, the above-described double recording processing can be executed when, for example, fixing contents recorded on a random access medium.

After recording the double-recorded data and the double registration information, the degradation check module 518 reads the first low-quality recorded data from the original recording area and checks the error rate of the first low-quality recorded data. If the error rate of the first low-quality recorded data is particularly high, the degradation check module 518 instructs to output a warning. Accordingly, the monitor 200 displays a warning.

Figure 8:
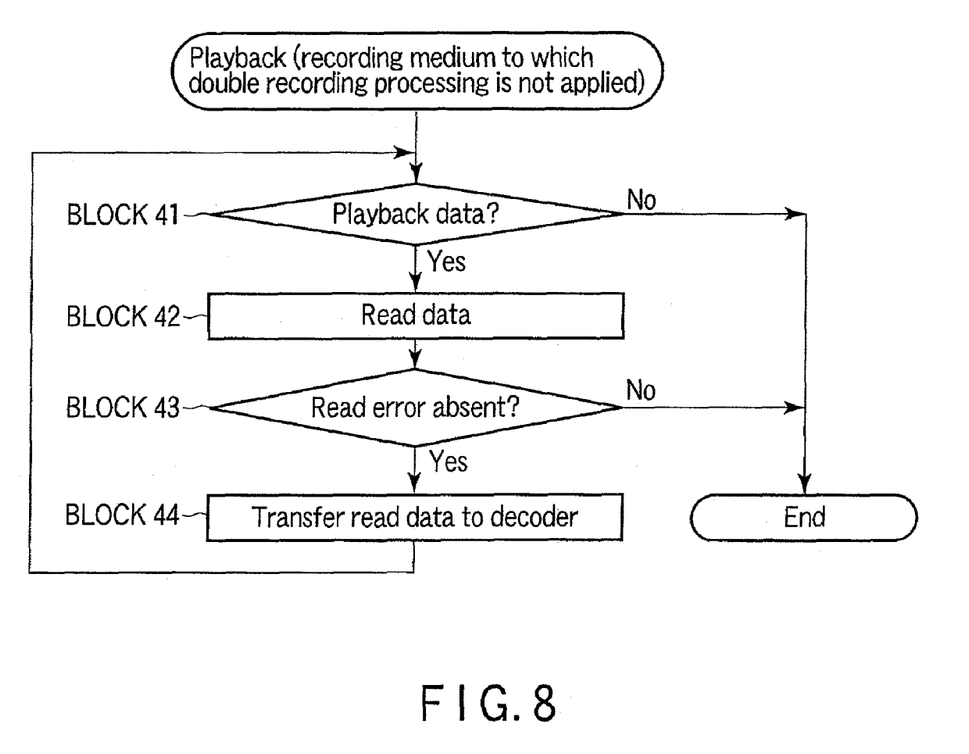
FIG. 8 is a flowchart illustrating an example of playback processing of a recording medium to which double recording processing is not applied.

Playback processing of a recording medium to which double recording processing is not applied will be described next with reference to FIG. 8. The playback/dubbing control module 519 checks whether playback data exists on the recording medium (BLOCK 41). If playback data exists (YES in BLOCK 41), the playback/dubbing control module 519 reads the playback data from the recording medium (BLOCK 42). If the playback data is correctly readable (YES in BLOCK 43), the read data is transferred to the decoder and played back (BLOCK 44). If the playback data is not correctly readable (NO in BLOCK 43), the playback/dubbing control module 519 determines that the data cannot be played back, and the playback processing ends. Alternatively, even if the playback data is not correctly readable, the playback/dubbing control module 519 continues playback until no playback data remains or a playback stop instruction is input. In this case, however, disturbance in image (e.g., block noise) or sound may occur.

Figure 9:
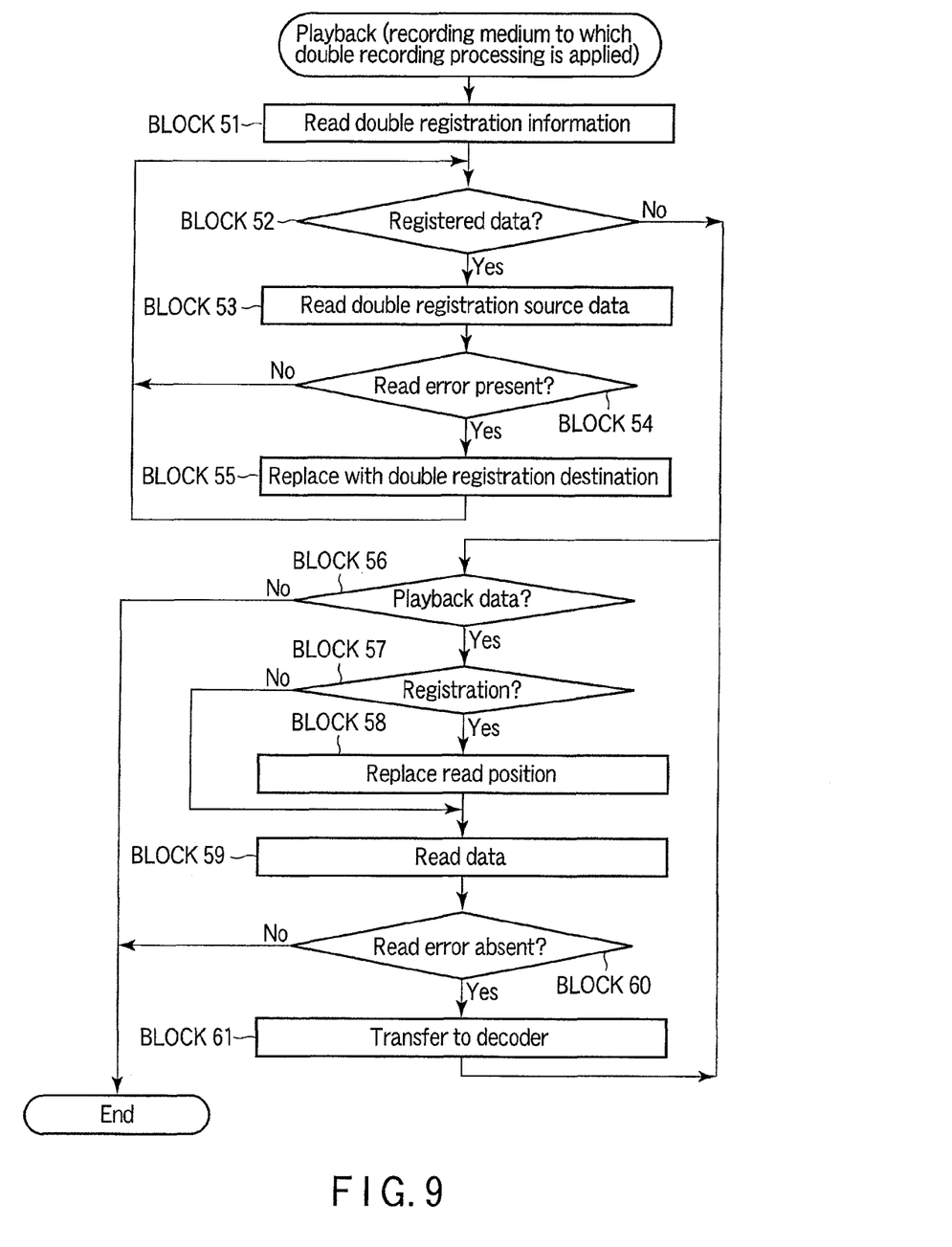
FIG. 9 is a flowchart illustrating an example of playback processing of a recording medium to which double recording processing is applied.
Figure 11:
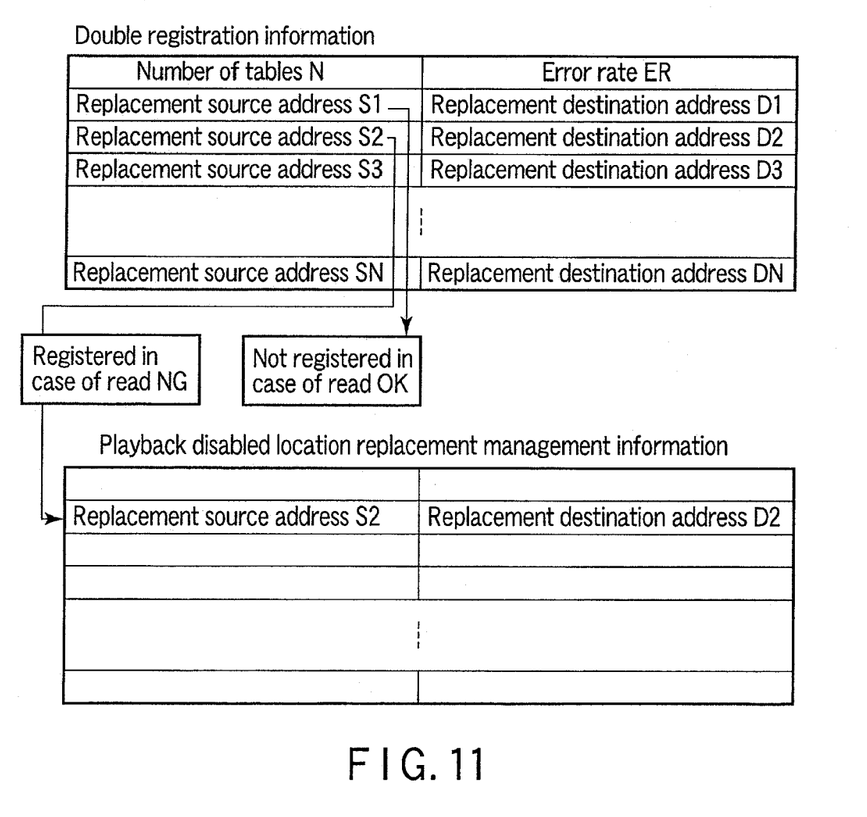
FIG. 11 is a view showing a use example of playback disabled location replacement management information.

Playback processing of a recording medium to which double recording processing is applied will be described next with reference to FIG. 9. The playback/dubbing control module 519 reads double registration information (FIG. 10) from the recording medium (BLOCK 51). The playback/dubbing control module 519 reads first low-quality recorded data from a replacement source address registered in the double registration information (YES in BLOCK 52) (BLOCK 53). If a read error has occurred (YES in BLOCK 54), the playback/dubbing control module 519 registers, in playback disabled location replacement management information, the replacement source address and the replacement destination address in association with each other (BLOCK 55), as shown in FIG. 11. In this way, the playback/dubbing control module 519 checks the read states of first low-quality recorded data at all replacement source addresses, registered in the double registration information. Note that if no read error has occurred upon reading the first low-quality recorded data (NO in BLOCK 54), no replacement source address is registered in the playback disabled location replacement management information. With the above-described processing, the replacement source address of unreadable first low-quality recorded data is registered in the playback disabled location replacement management information.

The playback/dubbing control module 519 reads data by referring to the playback disabled location replacement management information until no playback data remains (BLOCK 56, BLOCK 57, BLOCK 58, and BLOCK 59). If no read error has occurred (YES in BLOCK 60), the read data is transferred to the decoder (BLOCK 61). Namely, not the first low-quality recorded data at the replacement source address registered in the playback disabled location replacement management information but the double-recorded data at the replacement destination address registered in the playback disabled location replacement management information is read. If a read error has occurred (NO in BLOCK 60), playback may end, or continue, preparing the user for block noise or the like.

Figure 6:
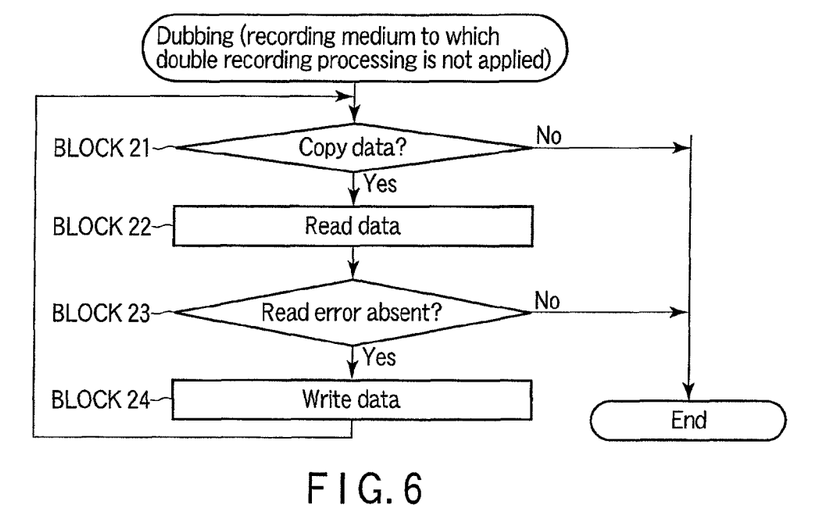
FIG. 6 is a flowchart illustrating an example of dubbing processing of a recording medium to which double recording processing is not applied.

Dubbing processing of a recording medium to which double recording processing is not applied will be described next with reference to FIG. 6. The playback/dubbing control module 519 checks whether copy data exists on the recording medium (BLOCK 21). If copy data exists (YES in BLOCK 21), the playback/dubbing control module 519 reads the copy data from the recording medium (BLOCK 22). If the playback data is correctly readable (YES in BLOCK 23), the read data is written to another recording medium (BLOCK 24). If the copy data is not correctly readable (NO in BLOCK 23), the playback/dubbing control module 519 determines that the data cannot be copied, and the dubbing processing ends. Alternatively, even if the copy data is not correctly readable, the playback/dubbing control module 519 directly writes the read data to another recording medium. In this case, however, disturbance in image (e.g., block noise) or sound may occur upon playing back the other recording medium.

Figure 7:
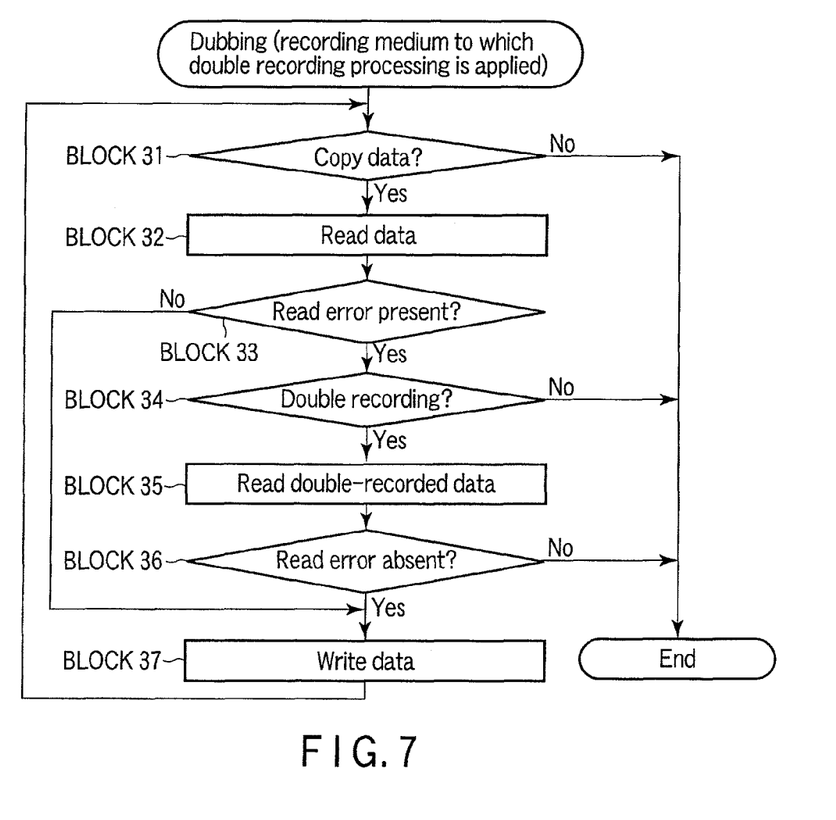
FIG. 7 is a flowchart illustrating an example of dubbing processing of a recording medium to which double recording processing is applied.

Dubbing processing of a recording medium to which double recording processing is applied will be described next with reference to FIG. 7. As in FIG. 9, dubbing processing may be executed after the replacement source address and the replacement destination address have been registered in advance in playback disabled location replacement management information in association with each other. However, dubbing processing without the pre-registration will be explained here.

The playback/dubbing control module 519 reads data until no copy data remains (BLOCKS 31 and 32). If no read error has occurred (NO in BLOCK 33), the playback/dubbing control module 519 writes the read data to another recording medium (BLOCK 37). If a read error has occurred (YES in BLOCK 33), the playback/dubbing control module 519 refers to double registration information (FIG. 10) (BLOCK 34) and reads double-recorded data corresponding to the data of the read error (BLOCK 35). If no read error has occurred in the double-recorded data (YES in BLOCK 36), the playback/dubbing control module 519 writes the read double-recorded data to another recording medium (BLOCK 37). Note that even if a read error has occurred in the double-recorded data, the playback/dubbing control module 519 may directly write the double-recorded data to another recording medium, preparing the user for block noise or the like.

Figure 15:
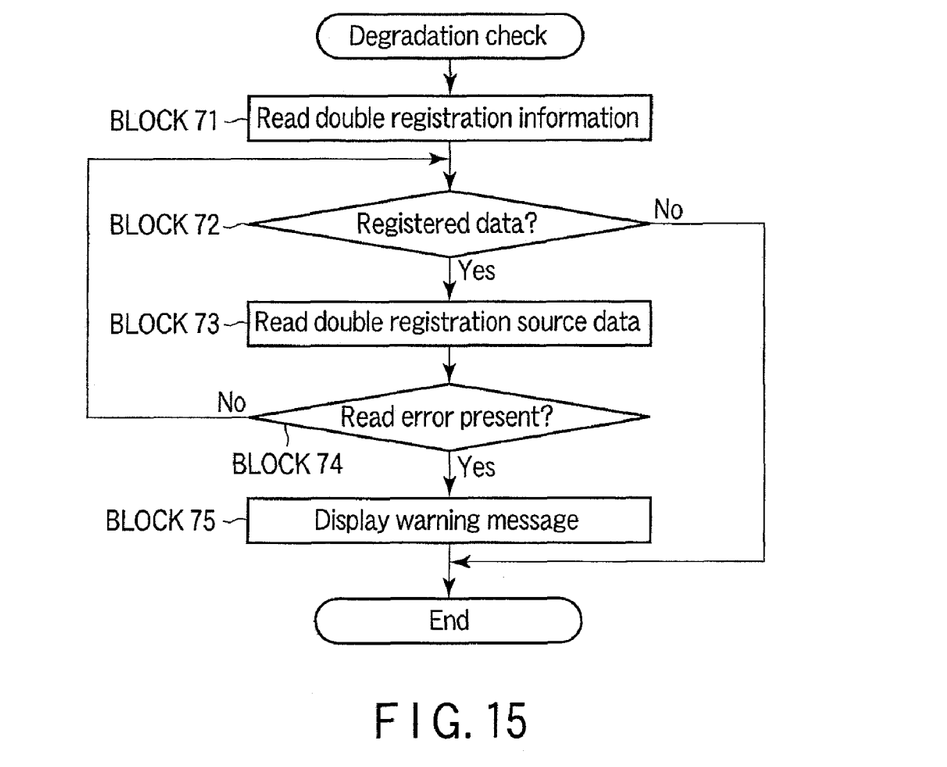
FIG. 15 is a flowchart illustrating an example of first degradation check.
Figure 16:
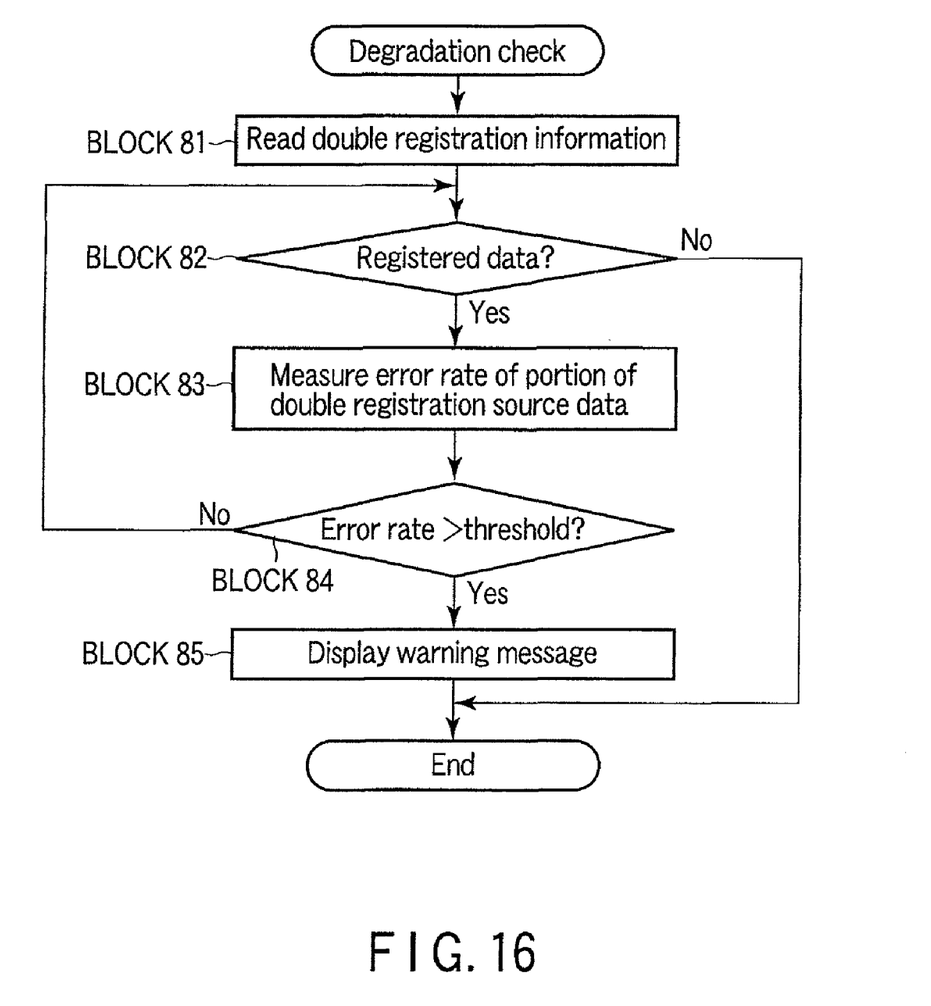
FIG. 16 is a flowchart illustrating an example of second degradation check.

Degradation check will be described next with reference to FIGS. 15 and 16. FIG. 15 is a flowchart illustrating an example of first degradation check. FIG. 16 is a flowchart illustrating an example of second degradation check.

Use of recording quality check shown in FIG. 13 allows to check degradation of a recording medium to which double recording processing is not applied. However, degradation of a recording medium to which double recording processing is applied can be checked by first degradation check shown in FIG. 15 or second degradation check shown in FIG. 16.

As shown in FIG. 15, the degradation check module 518 reads double registration information (BLOCK 71), refers to the replacement source address included in the double registration information (BLOCK 72), and reads first low-quality recorded data (BLOCK 73). If no read error has occurred (NO in BLOCK 74), the degradation check module 518 refers to the next replacement source address included in the double registration information (BLOCK 72), reads the next first low-quality recorded data (BLOCK 73), and checks the presence/absence of a read error (BLOCK 74). Upon detecting a read error (YES in BLOCK 74), the degradation check module 518 instructs to display a warning message to prompt the user to, e.g., create a backup. Accordingly, the monitor 200 displays a warning message to prompt the user to create a backup.

Alternatively, as shown in FIG. 16, the degradation check module 518 reads double registration information (BLOCK 81), refers to the replacement source address included in the double registration information (BLOCK 82), reads first low-quality recorded data, and measures its error rate (BLOCK 83). If the error rate is less than or equal to the threshold (NO in BLOCK 84), the degradation check module 518 refers to the next replacement source address included in the double registration information (BLOCK 82), reads the next first low-quality recorded data, and measures its error rate (BLOCK 83). If the error rate is higher than the threshold (YES in BLOCK 84), the degradation check module 518 instructs to display a warning message to prompt the user to, e.g., create a backup. Accordingly, the monitor 200 displays a warning message to prompt the user to create a backup.

Second double recording processing will be described next with reference to FIG. 17. As described above, the second double recording processing does not use low-quality management information. As shown in FIG. 17, without designation of double recording (NO in BLOCK 91), i.e., if the video recording/playback apparatus 100 has been set not to execute double recording, normal finalization processing is executed (BLOCK 100). In this case, double recording processing is not executed. If double recording has been designated (YES in BLOCK 91), i.e., if the video recording/playback apparatus 100 has been set to execute double recording, double recording processing is executed in finalization.

As described above, if double recording has been designated (YES in BLOCK 91), the free area size calculation module 511 calculates the size of a free area corresponding to the remaining capacity of a recording medium. If no free area exists at all, or the free area size is smaller than a predetermined size (NO in BLOCK 92), the free area size calculation module 511 notifies the user of the shortage of the free area. Accordingly, the monitor 200 displays a notification representing that double recording processing is unexecutable due to the shortage of the free area. In this case, not double recording processing but normal finalization processing is executed (BLOCK 100).

If it is possible to allocate a free area for double recording processing (YES in BLOCK 92), the error rate designation module 513 receives an error rate designation (BLOCK 93). The recording quality confirmation module 512 measures the error rate of recorded data in the recording area of each predetermined recording block (YES in BLOCK 94) (BLOCK 95). Upon detecting first low-quality recorded data having an error rate greater than or equal to the designated error rate (i.e., first error rate) (YES in BLOCK 96), the size of the detected first low-quality recorded data is added (BLOCK 97).

If the sum of the sizes (total size of the first low-quality recorded data) is larger than the total size of the free area, the double recording management module 516 notifies the user that double recording is impossible (NO in BLOCK 98). Accordingly, the error rate designation module 513 instructs to display the error rate designation window again so that the monitor 200 displays the error rate designation window for a power user or the error rate designation window for a general user. The user designates a higher error rate or automatic setting via the window (error rate change request window).

If the sum of the sizes (total size of the first low-quality recorded data) is less than or equal to the total size of the free area, the double recording management module 516 permits double recording (YES in BLOCK 98). The double recording module 515 corrects errors contained in the first low-quality recorded data using the error correction code and records, in the free area, error-corrected recorded data (i.e., high-quality recorded data) corresponding to the first low-quality recorded data (BLOCK 99).

The double recording management module 516 also generates double registration information (FIG. 10) and records it in the free area (BLOCK 99). The double registration information (recording management information) includes association information between the address (replacement source address) of the recording position of the first low-quality recorded data and the address (replacement destination address) of the recording position of the error-corrected recorded data corresponding to the first low-quality recorded data.

When the double-recorded data and the double registration information have been recorded in the above-described way (BLOCK 99), the finalization module 517 executes normal finalization (BLOCK 100).

The embodiment will be summarized below.

(1) At the time of finalization, the video recording/playback apparatus 100 measures the error rate of data recorded in a recorded area and records, in the free area, error-corrected recorded data corresponding to first low-quality recorded data. If a read error has occurred in the first low-quality recorded data at the time of, e.g., playback, the video recording/playback apparatus 100 plays back not the first low-quality recorded data but the error-corrected recorded data recorded in the free area. This can reduce block noise and the like. If a read error has occurred in the first low-quality recorded data at the time of dubbing, the video recording/playback apparatus 100 records, at the dubbing destination, not the first low-quality recorded data but the error-corrected recorded data recorded in the free area.

(2) For example, to check degradation of a disk, data of the whole disk is read, and the error rate of the read data is measured. In this method, however, the disk degradation check takes a relatively long time because data of the whole disk is read. However, the video recording/playback apparatus 100 can roughly detect the degradation state of the whole disk only by referring to the replacement source address contained in double registration information and checking the degradation state of first low-quality recorded data. That is, the degradation state can quickly be detected.

Note that the above-described double recording processing can be combined with primary alternate processing to be executed in formatting a recording medium or secondary alternate processing to be executed in accordance with use of a recording medium. Primary alternate processing assigns a logical address not to a defective sector but to a next normal sector in the recording area of a recording medium, thereby avoiding using the defective sector. In secondary alternate processing, when data is not correctly readable from an ECC block formed from a plurality of sectors in the recording area of a recording medium, the ECC block is defined as a defective block. The data of the defective block is then moved to an alternate block formed from a plurality of sectors in the alternate area of the recording medium. In this secondary alternate processing, the address of the defective block and that of the alternate block are managed in association with each other so as to replace access to the defective block with access to the alternate block.

As described above, according to the embodiment, it is possible to provide an information recording apparatus and information recording method capable of data recording effective for long-term storage. According to the embodiment, it is also possible to provide an information reading apparatus superior in reading data recorded in a format effective for long-term storage.

The various modules of the device described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel method and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording apparatus for recording first low-quality recorded data comprising an error rate equal to or higher than a first error rate in a free space upon finalization of a recording medium, comprising:

a reader configured to read data from a recording area of the recording medium;

a measurement module configured to measure an error rate of the recorded data of each predetermined data block;

a detector configured to detect the first low-quality recorded data based on an error rate measurement result of the measurement module; and a hardware recorder configured to correct an error in the first low-quality recorded data, to record error-corrected data corresponding to the first low-quality recorded data at a spare recording position of the free space of the recording medium, and to record recording management information for managing an address of a recording position of the first low-quality recorded data and an address of the spare recording position of the error-corrected data in association with each other at a management data recording position of the free space, wherein the measurement module is configured to store a second error rate equal to or lower than the first error rate and to generate low-quality management information associating an address of a recording position of second low-quality recorded data comprising an error rate equal to or higher than the second error rate with the error rate of the second low-quality recorded data, and wherein the detector is configured to detect the second low-quality recorded data as the first low-quality recorded data, if the error rate of the second low-quality recorded data in the low-quality management information is not less than the first error rate.

2. The apparatus of claim 1, wherein the measurement module is configured to generate the low-quality management information which associates a size and the address of the recording position of the second low-quality recorded data with the error rate of the second low-quality recorded data, and the apparatus further comprises a setting module configured to set the first error rate based on the low-quality management information and a size of the free space in order to make a size of the first low-quality recorded data with an error rate equal to or less than the first error rate smaller than the size of the free space.

3. The apparatus of claim 1, further comprising a degradation determination module configured to refer to the address of the recording position of the first low-quality recorded data in the recording management information on the recording medium, to read the first low-quality recorded data, and to determine a degradation state based on a read result of the first low-quality recorded data.

* * * * *